Oct. 3, 1933.  E. S. DEVLIN  1,928,851
CULINARY ACCESSORY
Filed Sept. 29, 1931

WITNESSES

INVENTOR
Eugene S. Devlin
BY
ATTORNEYS

Patented Oct. 3, 1933

1,928,851

UNITED STATES PATENT OFFICE 1,928,851

CULINARY ACCESSORY

Eugene S. Devlin, New York, N. Y.

Application September 29, 1931
Serial No. 565,863

6 Claims. (Cl. 53—8)

This invention relates to culinary accessories and has more particular reference to a drain appliance for cooking utensils to afford means for conveniently, safely and efficiently draining the utensil of liquids which it is desirable to separate from the solids.

Heretofore it has been the common practice to employ the cover of the utensil, or other such makeshift articles, as a means for retaining the solids in the vessel while draining the liquids therefrom. In addition to the time consumed and labor required under this method, there also exists the danger of scalding or the discomfort of steam burns.

It is, therefore, the outstanding object of the present invention to overcome the disadvantages above noted by providing a drain device which is particularly designed for the purpose, and which is readily attachable to a cooking utensil, and by virtue of which the operation of draining the liquids from the utensil while retaining the solids therein, is greatly facilitated while materially reducing the chances of, if not actually eliminating, the possibility of scalding or burning the user.

The invention further resides in the provision of a drain device of the indicated character embodying attaching means for rendering the device readily applicable to a number of variously sized utensils, and which means is capable of folding when not in active use, to a position with respect to the drain element or panel whereby the complete device occupies a minimum amount of space for storage or shipment.

As a further feature, the invention comprehends in a drain device or attachment of the indicated character, means which functions to stationarily support on its side the vessel with which it is associated, so as to relieve the user of the necessity of holding the vessel during the time required for the draining operation.

Other objects of the invention resides in the simplicity of construction and mode of use of the device, the economy with which it may be produced, and the general efficiency derived therefrom.

With the above recited and other objects in view, reference is had to the following specification and accompanying drawings, in which a single and preferred embodiment of the invention is disclosed, while the claims define the actual scope thereof.

Figure 1:
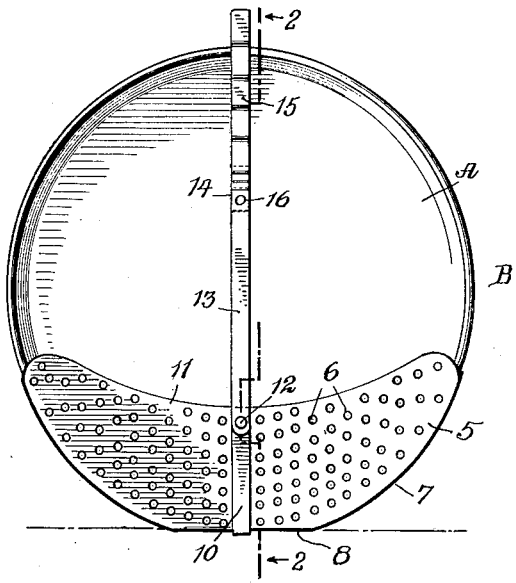
Figure 1 is a front view of a utensil with a drain device constructed in accordance with the invention shown in its applied active relation thereto for supporting the vessel in draining position.
Figure 2:
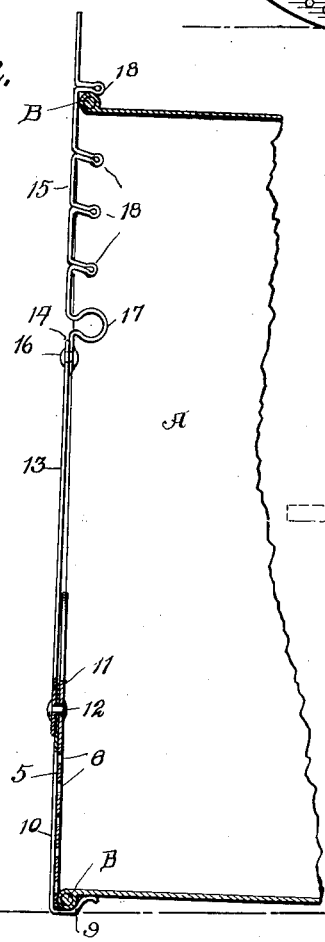
Figure 2 is a fragmentary enlarged vertical sectional view thereof taken approximately on the line indicated at 2—2 in Figure 1.

Referring to the drawings by characters of reference, A designates a cooking utensil which is formed with the usual rolled peripheral bead B and its open upper end.

The drain device or attachment constituting the present invention includes a drain element 5 which is of any suitable foraminous material, such as sheet metal, formed with perforations 6, or any equivalent material, and which element 5 is of substantially crescent shape with the outer arcuate edge 7 formed medially thereof with a flattened portion 8, the purpose of which will be hereinafter explained. The element 5 is designed to be positioned with its outer edge 7 adjacent to and extending around a portion of the beaded peripheral edge B of the utensil A, and is maintained in place by a hooked lug 9 located centrally of the flattened medial portion 8. While the hooked lug 9 may possibly be formed integral with the element 5, it is preferably formed as the terminal of a separate strip 10 in order to economize on the material used in the production of the element 5, and said strip 10 extends from the flattened portion 8 inwardly toward the inner concave edge 11 where it is secured by a rivet 12. The rivet 12 also serves as a fulcrum for the inner section 13 of an attaching arm, designated generally by the reference character 14, and which attaching arm includes an outer section 15, which outer section is fulcrumed at its inner end, as at 16, to the under or rear side of the outer extremity of the inner section 13. The outer arm section 15 adjacent its connection with the inner arm section 13 is formed with an open substantially ring shaped offset 17, so that the inherent spring material from which the arm section 15 is constructed allows for a slight increase in the length of the arm section 15 against the tension of the offset 17. The outer arm section 15 is further provided with a series of rearwardly offset fingers 18, which are slightly inclined toward the fulcrumed inner end of the arm section and which are designed to selectively engage over the peripheral bead B of the utensil to permit of the association of the device with utensils of varying diameters. In practice, the fingers 18 are designed to engage with the beaded periphery B of the utensil at a point diametrically opposite the point of engagement of the hooked lug 9 with said beaded periphery, so as to frictionally clamp and maintain the device in position. After the device is clamped in place as illustrated, the flattened medial portion 8 of the outer arcuate edge 7 serves as a means for engaging with the flat supporting surface to maintain the vessel on its side in a position to drain the liquid therefrom without permitting the vessel to roll.

Figure 3:
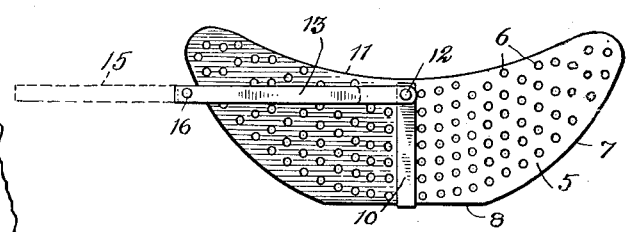
Figure 3 is a face view of the device removed in its folded condition.
Figure 4:
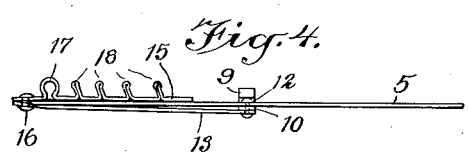
Figure 4 is an edge view of the device in its folded condition as illustrated in Figure 3.

When the device is not in use, the arm 14 may be folded, as shown in Figure 3, whereby the inner section 13 lies on one side of the element 5, while the outer section 15 is disposed on the other side thereof.

While there has been illustrated and described certain details of construction, it is to be understood that no limitation is necessarily intended thereto except as marked out by the scope of the appended claims.

I claim:

1. A drain device for cooking utensils including a foraminous strainer element of substantially crescent shape presenting a concave arcuate inner edge and a convex arcuate outer edge having a medial flattened portion, means for detachably clamping said element over the open end of the cooking utensil at one side thereof and with the flattened medial portion of the outer edge projecting from the periphery of said open end to constitute means for engaging with a flat supporting surface to maintain the utensil on its side in a position to drain the liquid contents therefrom through said element.

2. A drain device for cooking utensils including a foraminous strainer element adapted to be applied over the open upper end of the utensil adjacent one side thereof, and means for detachably clamping the same in operative relation to the cooking utensil, consisting of means at the outer end of the element to embrace the bead of the utensil at one side thereof and a pivoted arm adapted to protrude from the opposite edge of the element and engage with the edge of the utensil at a diametrically opposite point, said arm including pivotally connected sections adapted to fold and lie on opposite sides of the strainer element.

3. A drain device for cooking utensils including a foraminous strainer element adapted to be arranged over the upper open end of the utensil at one side thereof, and means for detachably clamping the same in position on said utensil including a depending hooked finger at the outer edge of said element, and an arm pivotally connected to said element and extending from the inner edge of the element when in active use and hooked depending means formed on said arm to engage with the utensil at a point diametrically opposite the hooked lug, said arm including a pair of hingedly connected sections adapted when not in active use to be folded to lie on opposite sides of the strainer element.

4. A drain device for cooking utensils including a foraminous strainer element adapted to be arranged over the upper open end of the utensil at one side thereof, and means for detachably clamping the same in position on said utensil including a depending hooked finger at the outer edge of said element, and an arm extending from the inner edge of the element and provided with hooked depending means engageable with the utensil at a point diametrically opposite the hooked lug, said arm being of a resilient material and having an open split ring-shaped offset rendering the same longitudinally extensible, and tensioned so as to normally contract longitudinally to effect a frictional clamping of the device in place.

5. A drain device for cooking utensils including a foraminous strainer element adapted to be arranged over the upper open end of the utensil at one side thereof, and means for detachably clamping the same in position on said utensil including a depending hooked finger at the outer edge of said element, a longitudinally extensible arm extending from the inner edge of the element, said arm being so constructed as to inherently effect its normal longitudinal contraction so as to effect a frictional clamping of the device in place and to tension the arm against extension and release, and a plurality of longitudinally spaced offset means on said arm for selective engagement with utensils of varying diameters at a point diametrically opposite the hooked lug.

6. A drain device for cooking utensils including a foraminous strainer element adapted to be arranged over the upper open end of the utensil at one side thereof, and means for detachably clamping the same in position on said utensil including a depending hooked finger at the outer edge of said element, and an arm extending from the inner edge of the element and provided with offset hooked means engageable with the utensil at a point diametrically opposite the hooked lug, said arm being fulcrumed at its inner end to the foraminous element and including swingably connected sections so as to permit of its folding to a position substantially within the confines of the foraminous element.

EUGENE S. DEVLIN.